Dec. 30, 1969            T. J. GRUBER            3,487,467
THERMAL ELECTRIC BEARING MONITORING SYSTEM
Original Filed June 21, 1965            4 Sheets-Sheet 1
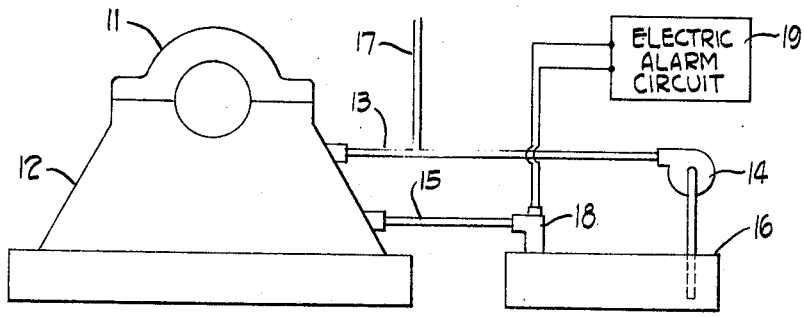
Fig. 1
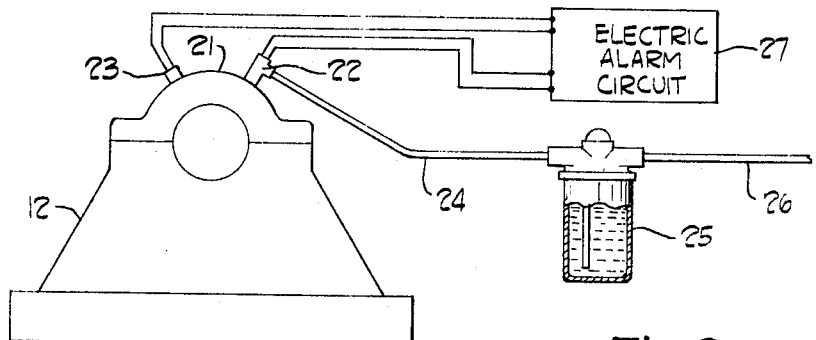
Fig. 2
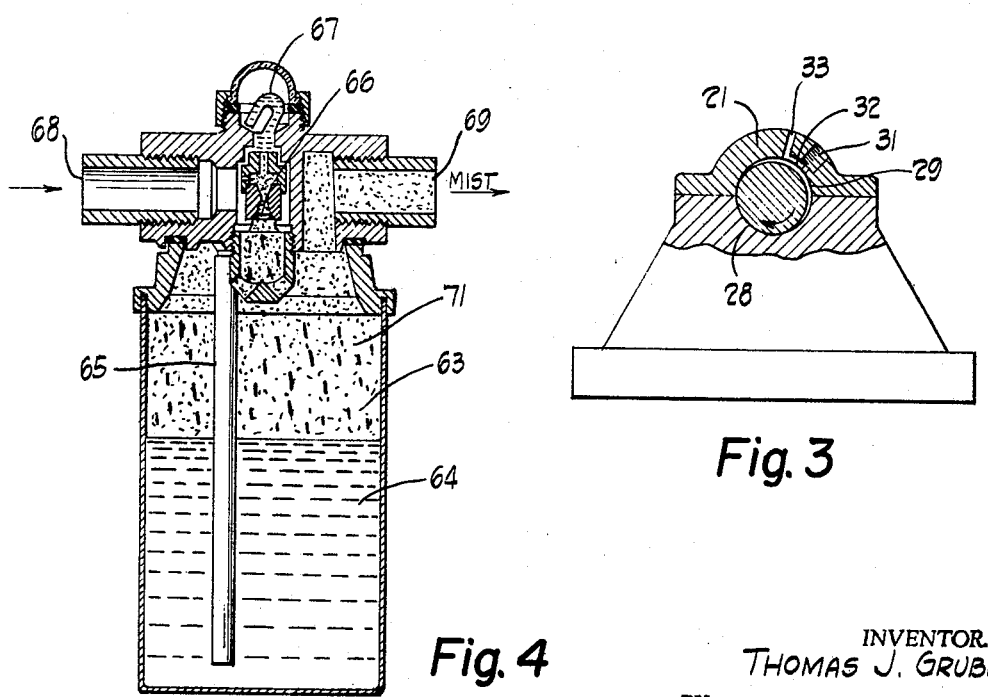
Fig. 3
Fig. 4
INVENTOR.
THOMAS J. GRUBER
BY
ATTORNEYS.

Dec. 30, 1969          T. J. GRUBER          3,487,467

THERMAL ELECTRIC BEARING MONITORING SYSTEM

Original Filed June 21, 1965          4 Sheets-Sheet 2

INVENTOR.
THOMAS J. GRUBER

BY
Schramm, Kramer & Sturges

ATTORNEYS.

INVENTOR.
THOMAS J. GRUBER
BY
Schramm, Kramer & Sturges
ATTORNEYS.

Dec. 30, 1969  T. J. GRUBER  3,487,467
THERMAL ELECTRIC BEARING MONITORING SYSTEM
Original Filed June 21, 1965  4 Sheets-Sheet 4

INVENTOR.
THOMAS J. GRUBER
BY
Schramm, Kummer & Sturges
ATTORNEYS

United States Patent Office 3,487,467
Patented Dec. 30, 1969

1

3,487,467
THERMAL ELECTRIC BEARING MONITORING SYSTEM
Thomas J. Gruber, Chagrin Falls, Ohio, assignor to Eaton Yale & Towne Inc., a corporation of Ohio
Continuation of application Ser. No. 465,392, June 21, 1965. This application July 8, 1968, Ser. No. 746,699
Int. Cl. F01m *1/00;* F16n *17/06;* G08b *21/00*
U.S. Cl. 184—6                        4 Claims

ABSTRACT OF THE DISCLOSURE

A system to protect bearings against overheating. An elbow fitting having a pair of intersecting bores therein for conducting lubricant is inserted into a bearing housing adjacent a bearing. The fitting includes a thermostat therein which detects increases in temperature of the bearing housing and/or increases in the temperature of the lubricant passing through the fitting. The thermostat located within the fitting also serves as a reclassifier when such a fitting is used as a temperature detector in oil mist systems. Also included is a temperature monitoring apparatus which monitors the temperature data provided by the fitting and indicates by an alarm an overheating condition.

---

This is a continuation of application Ser. No. 465,392, filed June 21, 1965 and now abandoned.

This invention relates to the protection of bearings and lubricating oil against conditions of overheat. In complex machinery having many bearings to be lubricated it has been the practice to utilize lubricating systems with suitable lines for supplying lubricant to each of the bearings of the apparatus. Various efforts have been made to assure adequate supply of lubricant to each of the bearings. In one type of system a liquid lubricating oil is employed and pumped to all of the bearings. More recently, in order to effect a substantial saving in the consumption of lubricating oil, mist systems have been proposed, which continuously spray an oil-bearing mist against the surfaces to be lubricated. The latter system is especially useful in the case of anti-friction bearings.

However, in either type of system bearings may be destroyed if there is a failure of the supply of lubricant. Such a failure manifests itself in excessive temperature of the bearing and, in the case of circulating oil systems, in excessive rise in temperature of the oil returned from the bearing. Mist systems are especially vulnerable to failure of lubricant supply since the temperature of the bearing may rise very rapidly after the failure of mist and very rapid destruction of the bearing takes place.

It is accordingly an object of the invention to provide improved means for protection of bearings whether by measurement of the temperature of the bearing itself, the temperature of circulating oil or mist temperature.

The invention is applicable to both hot and cold mist systems. In hot mist systems a predetermined temperature of the oil is necessary in order to enable the liquid oil to be converted into a mist. On the other hand, excessive oil temperature represents the condition of overheating of the bearing and must also be avoided. Accordingly in connection with hot mist systems it is an object of the invention to warn of existence of oil temperatures falling outside the permissible range.

Mist systems are designed to convey lubricating aerosols at velocities in the dry region and deliver the lubricating aerosol to the bearings through reclassifiers at velocities in the wet region. This means that the oil fog

2 in passage through the system piping will remain dry to the touch but after passing through the reclassifiers will become "wet" as it strikes the bearing surface when that surface is within one inch of the reclassifier.

Reclassifiers serve for producing agglomeration of very fine "dry" oil mist particles in the size range of 2 microns and less into larger particles constituting the wet mist. Then the wet mist is directed onto the bearing surface where the velocity of impingement settles out the oil in liquid form for lubricating purposes. Since oil temperature is very critical in the mist systems, it is desirable to ascertain oil temperature of the mist as it is being applied to the bearing. Accordingly, a further object of the invention is the provision of a temperature responsive unit which serves also as a reclassifier.

Other and further objects, features and advantages of the invention will become apparent as the description proceeds.

In carrying out the invention in accordance with a preferred form thereof, bimetallic thermostatic elements are employed which are contained within cylindrical casings. They are provided with normally closed electrical contacts which open when an excessive temperature is reached for which they have been adjusted. One of the thermostat elements is mounted in each location from which it is desired to obtain temperature warnings.

Control relay modules are provided, each electrically connencted to one of the thermostat elements and provided with a temperature-indicator, pilot, warning light which glows constantly to indicate normal conditions but which goes out if the temperature at the corresponding location becomes excessive. The control modules are joined to a common circuit for providing an alarm in case any one of the temperature indicators has provided a temperature alarm. The location of the fault is then ascertained by examining the bank of control modules to determine which pilot light has become extinguished.

A better understanding of the invention will be afforded by the following detailed description considered in conjunction with the accompanying drawing in which:

FIG. 1 is a schematic diagram of a bearing supplied with liquid oil through a circulating system having an oil sump or a heat exchanger to which oil is delivered from the bearing and having a temperature warning unit in the return oil supply line, warning of faults by occurrence of excessive oil temperature;

FIG. 2 is a schematic diagram of a mist system shown for simplicity as applied to a single bearing, although in practice a plurality of branch lines are provided so that many bearings may be lubricated from a single source of lubricating mist or aerosol;

FIG. 3 is a detailed drawing partially in section of an end view of a bearing showing the manner in which it is supplied with mist in a mist system;

FIG. 4 is a detailed drawing of a mist generator;

Like reference characters are utilized throughout the drawings to designate like parts.

Figure 5:
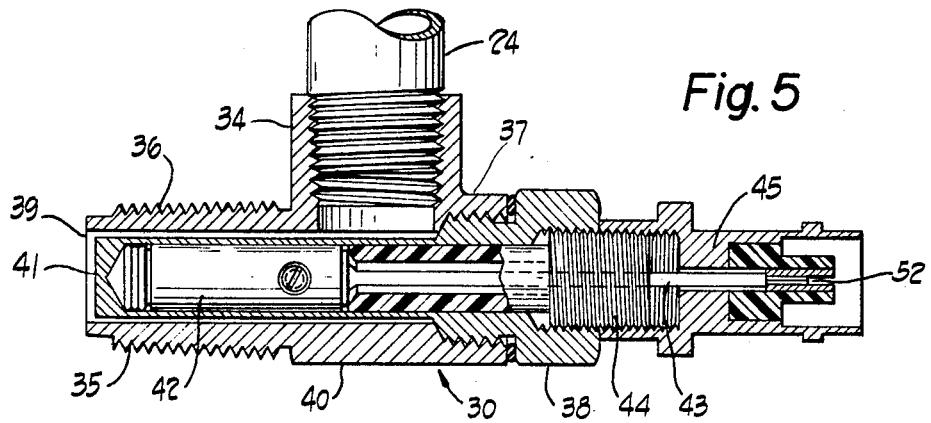
FIG. 5 is a view of a longitudinal section of a temperature alarm fitting serving also as a reclassifier when a mist system is employed.

As illustrated in FIG. 1 in a lubrication system in which one or more bearings are lubricated by circulating liquid oil, the temperature rise in the liquid oil return line from each bearing is detected in order to obtain a warning in the event of overheating of any bearing. For simplicity, only a single bearing 11 is shown in the drawing, mounted upon a pillow block 12 with a line 13 supplying liquid oil to the bearing 11 from an oil pump 14 and with a return line 15 discharging the oil which has been passed through the bearing into an oil sump 16, from which the pump 14 recirculates the oil through the lines 13 and 15.

It will be understood that branch lines 17 are provided for delivering oil from the pump 14 to other bearings but each bearing has its individual return line such as the line 15 with a thermostatic temperature indicator 18 therein from which the oil is discharged. For simplicity the oil is shown as being discharged directly to the oil sump 16 from the thermostatic indicator 18. It will be understood, however, that where a plurality of bearings are lubricated, the common return line from a plurality of oil temperature indicators may be utilized for returning the oil to the sump 16.

The sump 16 serves as a heat exchanger by discharging the heat of the discharge oil or radiating the heat of the discharge oil to the atmosphere. If desired, improved cooling means may be employed such as cooling fins, or cooling coils containing circulating water or refrigerant or the like may be provided on or in the oil sump or heat exchanger 16.

The thermostatic temperature indicator 18 is provided with an electric alarm circuit 19 for warning personnel in the event of overheating of the bearing 11 as indicated by a predetermined rise in temperature of the oil passing through the thermostatic indicator 18. The electric alarm circuit may constitute conventional means such as warning lamps, alarm bells or relays for shutting down the machinery in which the bearings such as the bearing 11 are mounted, as will be understood by those skilled in the art.

Figure 10:
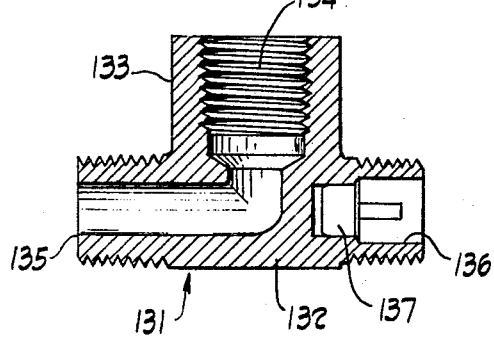
FIG. 10 is a view in longitudinal section of another type of fitting for providing indications of oil temperature.

The thermostatic oil temperature indicator is so constructed as will be explained more in detail in connection with the description of FIGS. 5 and 10 that the heat of oil flowing through an elbow-shaped fitting is transmitted by conduction to a bimetallic strip, actuating contacts included in the electric alarm circuit 19.

When a warning system in accordance with the invention is employed in connection with a mist lubricating system as illustrated in FIG. 2, preferably the temperature of the oil mist supplied to a bearing is detected; and a separate thermostat may be provided for measurement of bearing temperature directly. Although in FIG. 2 only a single bearing and temperature indicators only for that bearing are illustrated, it will be understood that the remaining bearings and control circuits for the remaining bearings are eliminated for simplicity and that the arrangement of FIG. 2 is adapted for supervision of operating conditions of a plurality of bearings.

As shown in FIG. 2, there is a bearing 21 having an oil mist classifier and temperature detector 22 mounted thereon and preferably also a thermostatic temperature detector 23 mounted in the bearing for response directly to bearing temperature. An aerosol or oil mist is supplied to the classifier and temperature detector 22 through a conduit 24 from a misting head 25 which in turn is supplied with compressed air through a low pressure air line 26. Suitable alarm circuits 27 are provided for response to temperature rise in the classifier 22 or in the bearing 21 as indicated by the thermostat 23.

Although oil mist systems are well adapted to the lubrication of non-friction bearings such as ball bearings, for simplicity in FIG. 3, a sleeve type bearing is shown as employed in an oil mist lubrication system. When mist lubrication is employed in a sleeve bearing, it is so arranged that the mist is ejected on the side of the journal away from the loaded side of the bearing.

Thus in FIG. 3, assuming that the bearing is loaded at the point 28 leaving some clearance 29 on the opposite side, the oil mist is injected into the clearance 29 through a mist fitting hole 31. A groove 32 is provided in order to enable the mist which has not been reclassified to be discharged from a vent hole 33.

A form of mist fitting, which may be employed by threading it into the mist fitting hole 31, is illustrated in FIG. 5. In accordance with the invention the mist fitting constitutes a combination temperature detector and reclassifier. It takes the form of a T-shaped body 30 with a longitudinally extending portion 40 and a lateral or transversely extending portion 34. The left hand end 35 of the longitudinally extending portion 40 is formed with a pipe thread 36 to fit the mist-fitting hole 31 of FIG. 3.

The portions 34 and 35 of the body 30 are hollow so as to serve the purpose of a pipe elbow in the lubrication conveying system. Thus the laterally extending portion 34 may be provided with an internal pipe thread receiving the mist supply conduit 24. Although for facility of manufacture the longitudinally extending portion 40 of the body 30 is formed with a bore extending the length of the portion 40, the right hand end 37 thereof is closed by a plug 38 so that the passageway for lubricant mist is only through the portions 34 and 35 of the body.

In order that the body 30 may constitute both a reclassifier and a temperature indicator, the plug 38 is so formed as to extend through the bore of the left hand end 35 of the longitudinally extending portion 40 of the body 30, spaced from the walls thereof to provide an annular orifice 39. The extension 41 of the plug 38 is made hollow so as to receive a cylindrical, encased bimetallic thermostatic element 42. The thermostatic element 42 is of such length as to be surrounded by the annular orifice 39 and to receive heat by conduction through the walls of the plug extension 41 from mist lubricant passing through the orifice 39.

Suitable means are provided for making electrical connections to the thermostatic element 42 such as an electrical lead or conductor 43, brought through insulating bushings 44 and 45. The insulating bushing 45 may constitute a conventional electrical connector. As shown, the bushing 44 has a threaded head received in a hollow end of the plug 38 and in turn receiving a threaded portion of the connector 45. The conductor 43 constitutes one terminal of the thermostatic element 42, the other terminal constituting a ground connection.

Figure 6:
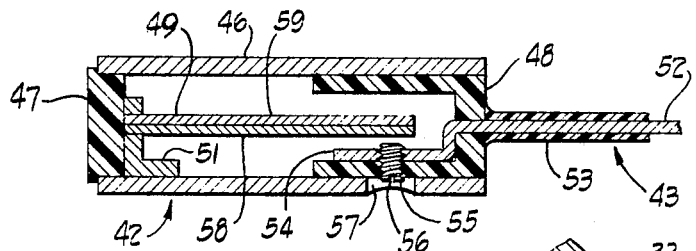
FIG. 6 is a detailed drawing of the temperature indicator unit employed in the fitting of FIG. 5.

The construction of the thermostatic element 42 is shown in FIG. 6. It has a casing formed by a cylinder 46 of metal such as brass, copper or other metal, forming good thermal contact with the walls of the plug extension 41 of FIG. 5, and plastic insulating members 47 and 48 closing the ends of the metallic cylinder 46. A thermostatic strip of bimetal 49 is mounted within the metallic cylinder 46 with one end against the insulating member 47 by means of a bracket 51 making electrical contact with the metallic cylinder 46 and secured thereto in a suitable manner as by means of rivets or welding.

The insulating member 48 is cup shaped with an opening to receive a conductor 52 serving as a connecting lead. The conductor 52 carries a molded insulating sheath 53 composed of a suitable plastic material compatible with the composition of the insulating cup 48 such that one may be fused or bonded to the other for forming an integral insulator surrounding the conductor 52.

The inner end 54 of the conductor 52 is bent down or suitably formed so that it forms a flat surface lying against the inner surface of the cup shaped insulator 48 and cemented thereto to form a support for an adjustable contact 55. The contact 55 is threaded into the portion 54 of the conductor 52 and provided with a screw eye 56 surrounded by an opening 57 in the metallic cylinder 46 to permit positioning of the contact tip of the contact 55 with respect to the end of the bimetal 49 for adjusting the temperature at which the bimetal 49 deflects away from the contact tip of the contact 55.

Although the invention is not limited to this specific arrangement, preferably the bimetal 49 is so mounted as to have one strip 58, away from the contact screw 55, of greater temperature coefficient of expansion than the other strip 59 so that the thermostatic element constitutes a normally closed switch with the metal 59 in contact with the tip of the contact screw 55 until a predetermined temperature is exceeded at which the bimetal strip 49 separates from the contact screw 55 and opens the circuit between the conductor 52 and the metallic cylinder 46.

Adjustment of the contact screw 55 serves to adjust the temperature at which the switching action of the bimetal strip 49 takes place.

The unit 30 of FIG. 5 serves as an indicator of temperature of any fluid passing through the orifice 39 in contact with the thermostatic element 42 regardless of whether the fluid is an oil mist, a liquid lubricant or other fluid the temperature of which is to be detected. The temperature responsive unit of FIG. 5 is therefore not limited to use with mist lubrication systems. When it is desired to obtain a direct indication of temperature at the bearing, a thermostatic temperature indicator such as the element 42 may be mounted in the bearing as shown at 23 in FIG. 2.

The misting head 25 may constitute any suitable type of atomizer such as illustrated in FIG. 4, for example, having an oil reservoir 63 containing a mass of oil 64 in liquid form with a tube 65 extending to the bottom of the reservoir 63 and connected to a Venturi tube 66 at the throat thereof through a curved tube 67. There is an inlet 68 for air under low pressure such as between 5 and 30 pounds per square inch, and an outlet 69 for the mist produced as a result of the oil drawn through the tube 67 into the throat of the Venturi tube in consequence of the diminished pressure taking place at the high velocity throat portion of the Venturi tube. As shown in FIG. 4 the droplets 71 of oil which fail to be drawn into the throat of the Venturi tube drop back into the liquid mass 64.

Figure 7:
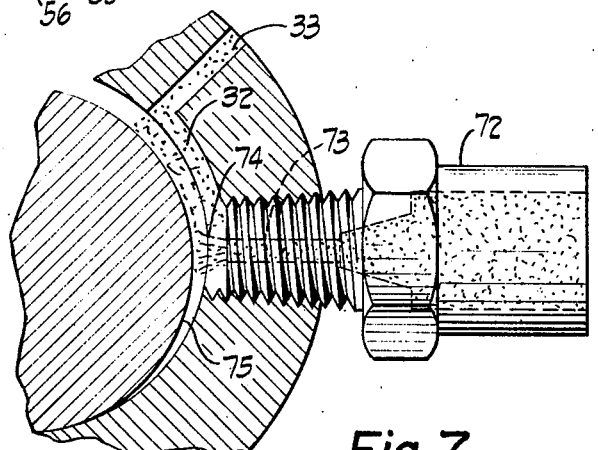
FIG. 7 is a schematic diagram of an alternative form of reclassifier, independent of temperature warning, in conjunction with which a bearing temperature indicator is provided to be responsive directly to bearing temperature.

If temperature detection in the reclassifier is not required and it is considered sufficient to detect temperature directly at the bearing as by means of the thermostat 23 shown in FIG. 2, a reclassifier such as shown in FIG. 7 may be employed. This constitutes a simple orifice 72 having a restriction 73 from which a stream of agglomerated oil particles issues which wet the surface 75 of the journal to be lubricated.

Figure 8:
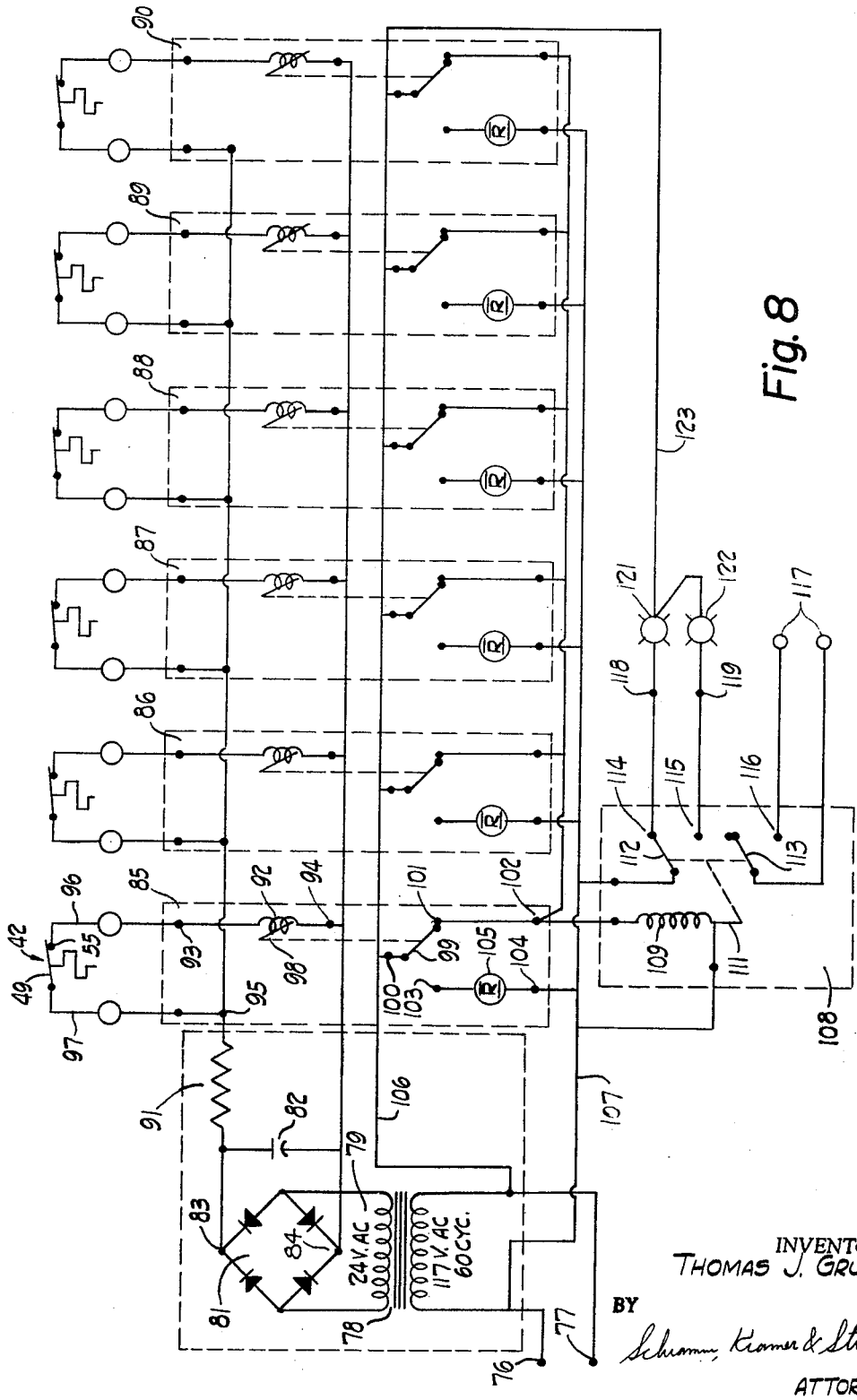
FIG. 8 is a circuit diagram of a warning system employing a bank of temperature indicators and warning modules for providing immediate indication of excessive temperature at any bearing and automatic remote alarm or shutdown.

Whether the temperature detectors are located in the oil stream or at the bearing the alarm system of FIG. 8 may be employed for warning of the existence of bearing failure and indicating the location of the fault. As shown in FIG. 8 there is a pair of A-C power supply terminals 76 and 77 for a connection to a source of alternating current power such as a conventional 60-cycle central power source.

In order to provide low voltage direct current for response to the temperature detectors, a stepdown transformer 78 is connected to the alternating-current supply terminals 76 and 77. The transformer 78 has a secondary winding 79 wound for 24 volts, for example, with a full wave solid state rectifier 81 connected to the secondary winding 79. Preferably, a smoothing condenser 82 is connected across the output terminals 83 and 84 of the full wave rectifier 81.

Modules represented by modules 85 to 90 are connected in parallel so as to be energized by the direct-current source from the terminals 83 and 84, preferably in series with a resistor 91. Each of the modules 85 to 90 is connected to a thermostatic temperature indicator located at a different bearing or other location where warnings of excess temperature are required.

The modules are provided with terminal pins adapted to be received in octal socket units for making removable connections to the current supply and control circuits. In the case of the module 85, there is a relay with a winding 92 connected between terminal pins 93 and 94. There is also a terminal pin 95. The corresponding octal socket has socket contacts for receiving the terminal pins 94 and 95 connected, respectively, to low voltage direct-current supply terminals 84 and 83. The octal socket is provided also with a socket contact for receiving the pin 93.

The bimetallic temperature detector element 42 is connected between the socket contacts for pins 93 and 95 through conductors 96 and 97. The relay coil 92 has an armature 98 actuating a double-throw switch having a movable contact 99 connected to an octal contact pin 100, a normally closed stationary contact 101 connected to octal pin 102, and a normally closed stationary contact 103 connected to an octal pin 104 through a pilot light 105. The octal socket for receiving the pin 100 is connected to one terminal 77 of the alternating-current power supply through a conductor 106. The octal socket contact for receiving the pin 104 is connected to the other alternating-current supply terminal 76 through a conductor 107.

There is an alternating-current alarm relay 108 having an actuating winding 109 connected between the alternating-current supply line conductor 107 and the octal socket contact for receiving the pin 102. The alarm relay 108 includes an armature 111 connected to a double-pole, double throw switch including a pair of movable contacts 112 and 113, a normally closed contact 114 cooperating with the movable contact 112, a normally open stationary contact 115 cooperating with the movable contact 112 and a normally open stationary contact 116 cooperating with the movable contact 113.

The contacts 113 and 116 are adapted for connection to a remote alarm circuit represented by terminals 117. The stationary contacts 114 and 115 are connected through conductors 118 and 119 to one side, respectively, of a normal signal light 121 and a fault signal light 122, the other sides of which are connected through a common conductor 123 to the alternating-current supply conductor 106 and terminal 77.

As previously explained, for the sake of example, it is assumed that the temperature detecting element 42 is a normally closed circuit device which opens upon occurrence of excessive temperature. Accordingly as long as normal temperature exists in each of the bearings or locations where excessive temperature is to be detected, each of the thermostatic switches remains closed. In the case of that associated with the module 85 there is a closed circuit between the pin 95 and the pin 94 across the direct-current supply through a conductor 97 to the bimetal blade 49, the contact 55, conductor 96, pin 93, the relay winding 92 and the pin 94.

Accordingly the winding 92 is actuated, moving the armature 98 so as to open the connection between the contacts 99 and 101 and close the connection between the contacts 99 and 103. This deenergizes the alternating-current alarm relay winding 109 so that its contacts remain in a normal position shown in the drawing of FIG. 8. This also closes a circuit through the pilot light 105 indicating to the operator that temperature conditions are normal in the bearing corresponding to the module 85. Since a circuit is also closed through contacts 112 and 114 of the alarm relay to the normal signal light, the normal condition signal is also received for the entire system assuming the other thermostatic detectors are also closed.

On the other hand, if excessive temperature occurs in the bearing corresponding to the module 85, the bimetal 49 is deflected away from the contact 55 and opens the circuit through the relay winding 92. This causes the movable contact 99 to drop back to the position illustrated in the drawing making connection with the stationary contact 101. Accordingly the circuit is closed from the alternating-current supply terminal 77 through conductor 106, pin 100, contact 99, contact 101, pin 102, alternating-current alarm relay winding 109, conductor 107 back to the other alternating-current supply terminal 76. Consequently the movable contacts 112, 113 of the alarm relay 108 are moved from the position illustrated so as to close a circuit to the contacts 112 and 115 and also to close the remote alarm circuit 117 through contacts 113 and 116.

As a result of the closure of the circuit through contacts 112 and 115, a circuit takes place from the alternating-current supply terminal 76 through the conductor 106, conductor 123, the fault light 122, conductor 119, stationary contact 115, movable contact 112, conductor 107, back to the other alternating-current supply terminal 76.

Consequently the operator receives a warning both as a result of the sounding of the remote alarm connected to terminals 117 and the lighting of the fault lamp 122. In order to ascertain the location of the fault the operator examines the pilot lights in the modules and observes that the pilot light 105 is extinguished because the circuit to this pilot light has been opened through the opening of the connection between contacts 99 and 103. Accordingly the apparatus not only provides an alarm as to the existence of the fault but indicates to the operator that the location of the fault is that represented by the module 85.

Figure 9:
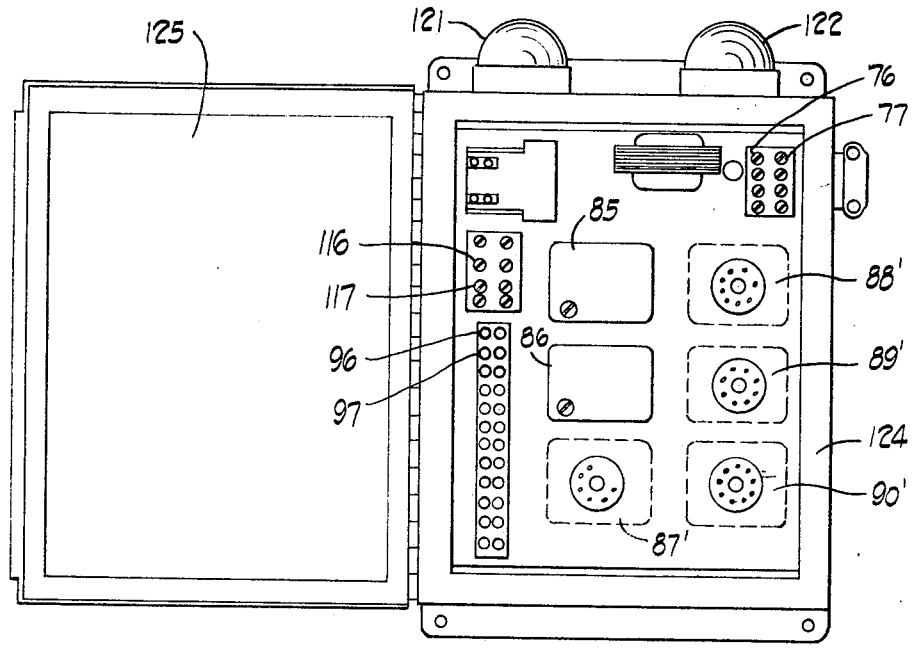
FIG. 9 is a view of actual control box employing the circuit diagram of FIG. 8 showing the arrangement of the warning pilot lights.

For convenience in assembly and installation of the warning and control system and observation of the location of faults, the apparatus of FIG. 8 is mounted in a case 124 shown in FIG. 9 having a normally closed cover door 125 with the normal signal lamp 121 and the fault signal lamp 122 at the exterior of the case 124 and the control modules such as the module 85, each mounted within the case 124 being removably mounted with pilot lamps such as the lamp 105 visible.

The modules 87, 88, 89 and 90 have been removed from the apparatus shown in FIG. 9 to illustrate the positions of octal sockets 87', 88', 89' and 90' for receiving the corresponding control modules. For protection of the control modules the door 125 is normally closed but upon the receipt of an alarm from the fault lamp 122 or the remote alarm connected to terminals 117, the door is opened to observe which of the lamps corresponding to the pilot lamp 105 has become extinguished.

As shown in FIG. 5, a temperature indicating unit in accordance with the invention may be arranged to serve also as a reclassifier for a mist type lubricating system. It will be understood, however, that the invention is not limited to the oil temperature indicating unit shown in FIG. 5 and does not exclude an arrangement in which an annular restriction orifice is not provided. For example, as illustrated in FIG. 10, a T-shaped body 131 may be employed having a longitudinally extending portion 132 and a transversely extending portion 133 with an internally threaded bore 134 in the transversely extending portion 133 to receive a threaded conduit pipe and with the longitudinally extending portion 132 having a bore extending from the left hand end 135 far enough to join the bore 134. The right hand end of the longitudinally extending portion 132 is formed, however, with a socket 136 closed at the bottom designed to receive a bimetal disc type thermostatic element 137.

Figure 11:
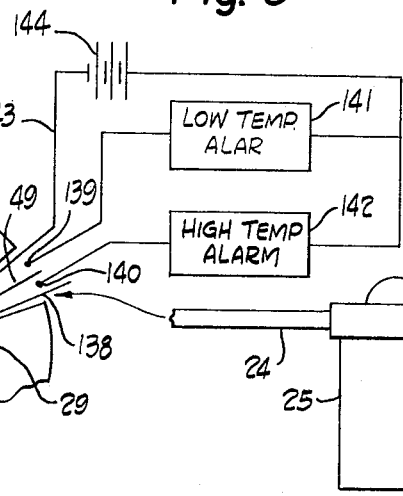
FIG. 11 is a schematic illustration of a high and low bearing temperature indicator and monitoring system.

In hot mist systems a predetermined minimum temperature is required to maintain the mist whereas the predetermined maximum temperature is indicative of excessive heating of the oil by the bearings. In such systems, as shown in FIG. 11, it may be desirable to employ a thermostatic temperature indicator element 138 which has a pair of insulated stationary contacts 139 and 140 on either side of the end of the bimetallic strip 49 for actuation, respectively, of a low temperature alarm circuit 141 and a high temperature alarm circuit 142. In this case a common grounded return line 143 may be employed from the schematically indicated direct current source 144.

Figure 12:
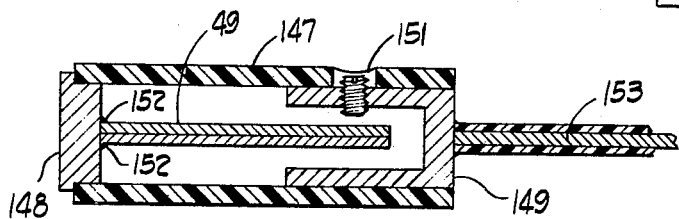
FIG. 12 is an embodiment of a thermostat element capable of indicating a relatively high and low temperature.

The construction of the high and low temperature thermostatic detector may be simplified if separate alarms for low and high temperature are not required. In this case, as shown in FIG. 12, the thermostatic device may constitute an insulating casing 147 having a metal plug 148 in one end, a metallic conductor cup 149 in the other end with contact surfaces on either side of the free end of the bimetallic strip 49.

If desired, the response may be made adjustable by providing a threaded contact screw 151 on one or both surfaces opposite the end of the strip 49. The left hand end of the bimetal strip 49 is secured in any suitable manner as by means of weld spots 152 to the metallic plug 148 which is grounded in any suitable manner. The contact cup 149 is connected to a conductor 153 as shown for connection in the control circuit.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended therefore, to cover all such modifications and variations as wall within the scope of the invention.

What is claimed is:

1. A temperature monitoring system for monitoring the safe operation temperature of critical bearings of the type including a bearing housing into which or from which an oil mist lubricant passes, said system comprising:
   a fitting of high heat transfer characteristic adapted to be connected to said bearings, said fitting having a bore therethrough for transporting said oil mist lubricant, and
   a socket in said fitting intersecting said bore,
   a thermostat element mounted in said socket to provide communication with said oil mist lubricant for detecting the temperature of said oil mist lubricant and said bearing housing, said thermostat including a casing intersecting said bore to define a reclassifier for said oil mist lubricant, and
   alarm means coupled to said thermostat element for emitting a signal in response to a predetermined temperature detected by said thermostat element.

2. A temperature monitoring system according to claim 1 wherein,
   said thermostat casing is in concentric spaced relation with the wall defining said bore, and
   the flow of said oil mist entering said bore is restricted by said thermostat casing thereby effecting reclassification of said oil mist.

3. A temperature monitoring system according to claim 1 wherein said thermostatic element includes means to indicate a first and a second temperature, and said system further comprises means coupled to said thermostat to indicate said first temperature and said second temperature.

4. A temperature monitoring system according to claim 3 wherein
   said thermostat casing is in concentric spaced relation with the wall defining said bore, and
   the flow of said oil mist entering from said bore is restricted by said thermostat casing thereby effecting reclassification of said oil mist.

References Cited

UNITED STATES PATENTS

| | | | |
|---|---|---|---|
| 1,458,297 | 6/1923 | Jacobus | 236—86 |
| 1,808,092 | 6/1931 | Wimmer. | |
| 2,143,533 | 1/1939 | Archea et al. | |
| 2,326,475 | 8/1943 | Matthews. | |
| 2,467,174 | 4/1949 | Wilson. | |
| 3,052,123 | 9/1962 | Gustafson. | |
| 3,188,563 | 6/1965 | Jameson. | |
| 3,221,125 | 11/1965 | Young | 200—138 |

FRED C. MATTERN, Jr., Primary Examiner

M. ANTONAKAS, Assistant Examiner

U.S. Cl. X.R.

340—270